Aug. 30, 1960 J. P. LOFINK 2,950,739
DIAPHRAGM MOTOR
Filed March 6, 1957

INVENTOR.
Joseph P. Lofink
BY
Webb, Mackey & Burden
HIS ATTORNEYS

United States Patent Office 2,950,739
Patented Aug. 30, 1960

2,950,739

DIAPHRAGM MOTOR

Joseph P. Lofink, Neville Island, Pa., assignor to The Chaplin-Fulton Mfg. Co., Pittsburgh, Pa., a corporation of Pennsylvania Filed Mar. 6, 1957, Ser. No. 644,271

2 Claims. (Cl. 137—788)

This application relates to a diaphragm motor operated by fluid pressure. More particularly, it relates to a diaphragm motor so constructed as to provide a long working stroke under constant pressure. The motor is especially suitable for operating valves of various types.

In the past, diaphragm motors used to regulate valves have done so in accordance with an accepted design practice whereby the effective area of the diaphragm decreases as the diaphragm distends itself at the center in moving that valve to adjust the valve opening. This effect introduces a non-constant factor making it impossible to secure full uniformity of action. For example, if the thrust of the diaphragm is countered by a so-called counter-balance spring, for instance a valve closing spring, the spring force of the spring increases as the valve opens and at the same time the force of the diaphragm decreases, assuming constant fluid pressure. The result, applied to the specific example of a back pressure regulator, for instance, is that the back pressure maintained thereby rises to a significantly higher level when the valve is nearly fully or fully open in comparison to when it becomes initially or partially opened, due to the necessity for higher pressure to act on the reduced effective area of the diaphragm to strike a balance with the increased force of the nearly fully or fully deflected spring.

According to this application a long travel diaphragm is provided which has a relatively deep fold and in which there is an increase in the effective area proportionate to the increase in the resistance of the valve closing spring. This increase is due to the shift or roll of that fold radially to increase the effective area of the diaphragm as the stroke of the motor increases. The force of the diaphragm under constant pressure thereby increases and can be adjusted to just equal the increasing resistance of a compressed spring. The result is a long stroke powered by a diaphragm under constant fluid pressure.

If desired the diaphragm fold can be designed so that the force of the diaphragm increases faster than the force developed by a counter-balancing spring and thereby provide for a fast opening relief valve.

Figure 2:
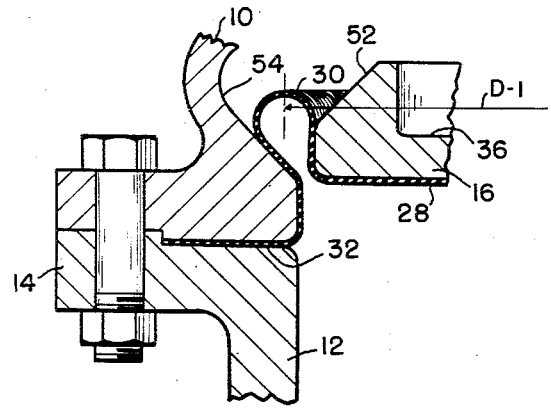
Figure 2 is an enlargement of a portion of Figure 1 showing the diaphragm in the same distended position corresponding to a wide open valve setting.

In the drawing, I show a preferred embodiment of my diaphragm motor including a necked down hollow casing 10 having the large end thereof secured to a valve body 12 by means of a bolted-together flange joint 14. A circular diaphragm pan or plate 16 is shiftably mounted axially in the cylinder wall thus provided, for travel between the solid line position showing one extreme of travel and the dotted line position shown by dotted lines 16a illustrating full travel in the opposite direction.

An operating rod 18 which may be a valve stem in a valve operated by the motor, is positioned on the pressure side of the plate 16 and has a thimble 20 at the head thereof, a pin 22 securing the valve stem in the socket of the thimble. At the opposite end the valve stem 18 is connected to a valve (not shown).

The thimble 20 has an enlarged lower end engaging a soft clamping washer 24 and protrudes through a center opening in the diaphragm plate 16 in which it is securely held by means of a lock nut 26. A hexagonal head 27 on the thimble 20 is employed to hold it from rotation while the lock nut 26 is drawn down in place.

The clamping washer 24 clamps the midportion of a flexible diaphragm 28 to the underside of the diaphragm plate 16, the diaphragm being generally disc shaped and having a single continuous annular fold 30 with straight sides between its center and its edges by which the effective diameter of the disc is reduced due to the offset formation of the fold. The circumferential edge of the diaphragm is circular and clamped fluid tight in a relieved annular portion 32 in the flange joint 14. The diaphragm 28 is pressure movable through a relatively long stroke of travel and is spring loaded at all times on its non-pressure side by means of an adjustable coil compression spring 34 which is connected at one end to an annular seat portion 36 in the diaphragm plate 16 and which is connected at the opposite end to an adjustable seat member 38.

The hollow casing 10 defines a spring chamber in which the spring 34 operates and which is closed at the small end of the casing by a blanking plate 40 having hold-down screws 42 secured to the casing 10. A spring adjusting screw 44 is threaded through the center part of the blanking plate 40 and engages a ball 46 forming a swivel connection with a socket in the seat member 38 for the spring. A lock nut 48 holds the adjusting screw in the position in which it is adjusted and a cover 50 threads onto the blanking plate 40 so as to conceal and protect the adjusting screw.

In Figure 2, the diaphragm plate 16 and the diaphragm 28 are shown in their uppermost position within the cylinder wall corresponding to wide open position of a valve (not shown) operated by the motor. In this position the diaphragm has its maximum effective diameter D1 on which up fluid pressure can act. In this case the tensile strain in the diaphragm at the point where the diaphragm moves radially away from the plate 16 is directed squarely axially to afford maximum pull at the edges of the plate 16.

The confronting portions of the plate 16 and the cylinder wall have mutually relieved surfaces 52 and 54 which flare in the direction of the fold 30 so as to provide a clearance space therefor. In the position shown in Figure 2 the flared surface 54 terminates at a point generally transversely aligned with the crown of the fold 30 so as to insure a safe length of back up surface for the wall of the fold 30 to be deposited upon.

Figure 3:
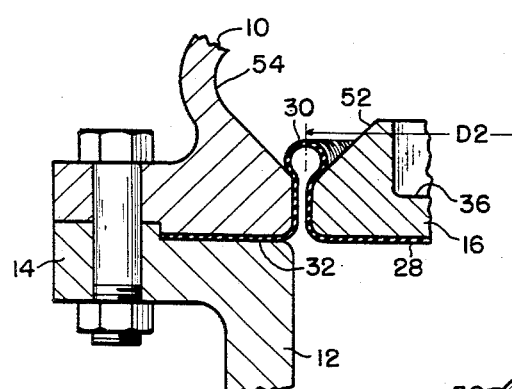
Figures 3 and 4 are similar to Figure 2 but showing the diaphragm in positions for moving a valve to half open and fully closed positions.

In Figure 3 in which the position taken by the fold 30 corresponds to the halfway open position of the valve, the flared portions 52 and 54 exactly confront one another and the straight sides of the fold extend upwardly along the peripheral cylinder walls from an annular elongated throat space which widens into the generally V-shaped clearance space formed by the flared portions 52 and 54. In this position the annular diameter of the fold 30 has an intermediate value D2 less than D1 previously considered.

Figure 4:
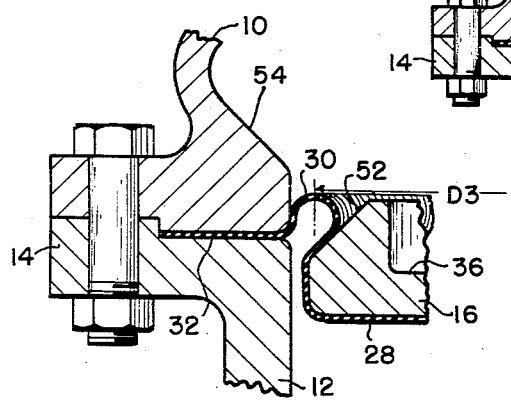

In Figure 4 in which the diaphragm plate 16 has moved the valve to fully closed position, the fold 30 has unwrapped from the flared surface 54 and from a portion of the cylindrical part of the cylinder wall and has at its opposite side wrapped against the flared surface 52 on the diaphragm plate 16. The surface 54 is generally conically shaped so as to receive the fold all the way around the plate 16.

In the position shown in Figure 4 the tensile strain in the diaphragm is directed so as to have a substantial horizontal component and the effective area of the diaphragm is considerably less than in the positions shown in Figure 3 where the diaphragm partially straightens and in Figure 2 where fluid pressure is completely axially directed against the diaphragm. In Figure 4 the diameter D3 of the annular fold 30 is at a minimum corresponding to the valve closed position. It should also be noted that the conical surface 52 extends to a point where it is substantially transversely aligned with the crown of the fold 30 thereby insuring a safe length of back-up surface for the wall of the diaphragm deposited upon it.

Figure 1:
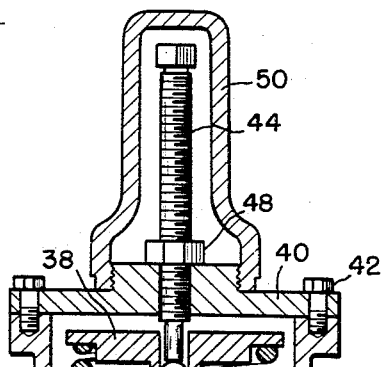
Figure 1 is a central longitudinal section showing a diaphragm motor embodying this invention.
Figure 1:
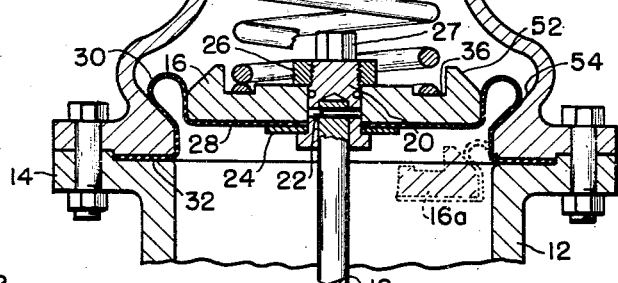

By way of illustration, an actual embodiment of the diaphragm 28 shown in Figure 1 had a circumference diameter of 7" and afforded a valve travel of 1¼" as the plate 16 moved between its dotted line position 16a and its solid line position. In that embodiment in connection with a feature thereof best shown in Figure 3, the annular elongated throat space in which the straight sides of the fold 30 fit were formed by the closely spaced parallel back-up surface on the plate 16 and the adjacent inner periphery of the flange joint 14. The flared surfaces 52 and 54 formed a 90° V-shaped angle included at the mouth of the throat and these two confronting surfaces were symmetrical to one another each having a 45° bevel.

I have found it essential to have the bevel slopes 52 and 54 in order to provide uniform action. When the diaphragm is in a neutral position, that is, when the plate 16 is opposite to the bottom of the casing 10 and the diaphragm 28 is in line with the relieved annular portion 32, as shown in Figure 3, the action of the diaphragm is critical. Thus, if the plate 16 were moved even minutely upwardly from the position shown in Figure 3, the fold 30 would immediately go into the full position shown in Figure 2 if it were not restrained by the beveled slope 54. The slope 54 controls the rate at which the fold 30 changes its shape from the shape shown in Figure 3 to the shape shown in Figure 2. There is thus a gradual increase in the effective area of the diaphragm instead of an abrupt change from the effective area shown in Figure 3 to the effective area shown in Figure 2. On downward movement of the plate 16 from the position shown in Figure 3, the slope 52 controls the rate at which the fold 30 changes from the shape shown in Figure 3 to the shape shown in Figure 4.

For the sake of comparison, test data was obtained employing a standard 2" reducing regulator having a diaphragm diameter of 5" O.D., a valve stroke or travel of ½", and a valve port diameter, that is passage area, of 1¾". That standard valve was adjusted to deliver 10 p.s.i. outlet pressure at a low flow rate and when the flow rate was increased to maximum, the regulated pressure was observed to have dropped to 6½ p.s.i., thus displaying a 3½ p.s.i. fall-off between its extremes of operation. A reducing regulator with these same measurements but using the present improved diaphragm and V-shaped clearance space therefor, maintained 10 p.s.i. outlet pressure both at the low flow rate and at the maximum flow rate. From this example it is apparent that constant pressures can be produced for any desired pressure range merely by proper selection of the rate of the counter-balancing spring and employing the present long travel diaphragm and 45° flare surfaces on each side of the fold of the diaphragm.

Any suitable flexible diaphragm material is employed which can be shaped to the desired formation illustrated herein and one preferred diaphragm proving highly satisfactory was formed from a sheet of nylon cords having a Buna-N coating of elastomeric material.

I have shown a preferred embodiment of my invention but it is to be understood that it may be otherwise embodied within the scope of the following claims.

I claim:

1. A valve operating mechanism actuated by fluid pressure comprising a hollow casing having a circular opening in a body portion thereof, a flexible diaphragm extending across said opening and secured at its periphery to said casing, a circular diaphragm plate centrally positioned on said diaphragm and connected thereto and having a diameter less than that of the opening, said plate having a portion extending into said casing, a spring operatively connected to the plate to exert pressure on said diaphragm, means on said plate for securing it to valve operating mechanism, the peripheral edge of the portion of said plate extending into the casing providing a surface sloping toward the center of the plate, the edge of said surface having the largest diameter being closer to the diaphragm than the edge of said surface having the smallest diameter, said casing providing a surface extending around said opening and sloping outwardly from the opening in a direction away from the sloping surface on said plate, said flexible diaphragm having an annular looping fold extending into the space between said sloping surfaces whereby upon axial movement of the diaphragm the effective area of the diaphragm is varied, said diaphragm having a surface exposed to fluid pressure in opposition to the pressure exerted by said spring said effective area increasing and decreasing as the pressure of the spring increases and decreases whereby the valve operating mechanism actuates a valve in accordance with the fluid pressure applied to said diaphragm.

2. A valve operating mechanism actuated by fluid pressure comprising a hollow casing providing a cylinder wall, a fluid pressure movable plate therein having a complementary surface extending in spaced apart parallel relationship with said cylinder wall to define the peripheral cylindrical surfaces of an annular elongated throat space formed therebetween, a plate-connected diaphragm having its circumferential edge secured fluid tight to said cylinder wall and having a looping annular fold between the peripheral edge of the plate and the wall of the casing, the casing also providing a surface sloping radially outwardly from said cylindrical surface in the casing, the plate providing a surface sloping radially inwardly from said cylindrical surfaces on the plate, said looping annular fold extending between said peripheral cylindrical surfaces and said sloping surfaces whereby upon axial movement of the diaphragm the effective area of the diaphragm is varied, said diaphragm being adapted to have fluid pressure applied to it on its surface facing opposite to the annular fold, and a spring within the hollow casing and operatively connected to said plate on the side of the plate away from the diaphragm, the effective area of the diaphragm increasing and decreasing as the pressure of the spring increases and decreases.

References Cited in the file of this patent

UNITED STATES PATENTS

| | | |
|---|---|---|
| 971,583 | Bell | Oct. 4, 1910 |
| 1,077,472 | Hofmann | Nov. 11, 1913 |
| 2,651,328 | Gamble | Sept. 8, 1953 |
| 2,846,983 | Otto | Aug. 12, 1958 |

FOREIGN PATENTS

| | | |
|---|---|---|
| 667,036 | France | June 3, 1929 |